US012756708B2

(12) United States Patent
Singh et al.

(10) Patent No.: US 12,756,708 B2
(45) **Date of Patent: *Oct. 6, 2026**

(54) DEVICE-AGNOSTIC ACCESS CONTROL TECHNIQUES

(71) Applicant: EQUIFAX INC., Atlanta, GA (US)

(72) Inventors: Dilip Singh, Alpharetta, GA (US); Gary Keller, Woodstock, GA (US); Robert Beatty, Decatur, GA (US); Sriram Tirunellayi, Duluth, GA (US)

(73) Assignee: EQUIFAX INC., Atlanta, GA (US)

( * ) Notice: Subject to any disclaimer, the term of this patent is extended or adjusted under 35 U.S.C. 154(b) by 36 days.

This patent is subject to a terminal disclaimer.

(21) Appl. No.: 19/059,024

(22) Filed: Feb. 20, 2025

(65) Prior Publication Data

US 2025/0193183 A1 Jun. 12, 2025

Related U.S. Application Data

(63) Continuation of application No. 17/657,055, filed on Mar. 29, 2022, now Pat. No. 12,244,593.

(51) Int. Cl.

| | |
|---|---|
| ***G06F 7/04*** | (2006.01) |
| ***G06F 18/214*** | (2023.01) |
| ***H04L 9/40*** | (2022.01) |

(52) U.S. Cl.

CPC ........ *H04L 63/0876* (2013.01); *G06F 18/214* (2023.01); *H04L 63/107* (2013.01); *H04L 63/20* (2013.01)

(58) Field of Classification Search

CPC . G06F 21/316; G06F 21/335; H04L 63/0876; H04L 63/107; H04L 63/20

See application file for complete search history.

(56) References Cited

U.S. PATENT DOCUMENTS

| | | | | |
|---|---|---|---|---|
| 9,641,489 | B1 * | 5/2017 | Kaufman | H04W 12/12 |
| 9,906,511 | B1 * | 2/2018 | Kolman | H04L 9/3242 |

(Continued)

OTHER PUBLICATIONS

DAngelo et al, An Artificial Intelligence-Based Trust Model for Pervasive Computng, Nov. 6, 2015, IEEE, pp. 701-706. (Year: 2015).*

(Continued)

*Primary Examiner* — Philip J Chea
*Assistant Examiner* — Jenise E Jackson
(74) *Attorney, Agent, or Firm* — Kilpatrick Townsend & Stockton LLP

(57) ABSTRACT

A system can efficiently control access to an interactive computing environment. The system can receive authentication data of an authentication attempt associated with an entity. The system can determine, for the entity, a historical vector including features that include sub-features. The historical vector can be determined by generating synthetic data, generating weights, and determining probabilities. The synthetic data can be based on historical authentication attempts by entities other than the entity. The weights can correspond to sub-features of the historical vector. The probabilities can indicate a likelihood that a corresponding sub-feature is involved in the authentication attempt. The system can compare the historical vector to the authentication data. The system can generate a responsive message based on the comparison for controlling access to the interactive computing environment.

20 Claims, 5 Drawing Sheets

400

(56) References Cited

U.S. PATENT DOCUMENTS

| | | | | |
|---|---|---|---|---|
| 10,044,745 | B1 | 8/2018 | Jones et al. | |
| 10,108,791 | B1 | 10/2018 | Masterman | |
| 10,114,935 | B2 * | 10/2018 | Das | H04L 63/0861 |
| 2020/0045044 | A1 | 2/2020 | Turgeman | |
| 2020/0097817 | A1 * | 3/2020 | Harris | H04L 63/1441 |

OTHER PUBLICATIONS

Chen et al, Risk Probability Estimating Based on Clustering, Jun. 20, 2003, IEEE, pp. 229-233. (Year: 2003).*
U.S. Appl. No. 17/657,055, “Notice of Allowance”, Nov. 1, 2024, 10 pages.
International Application No. PCT/US2023/016406, “International Search Report and Written Opinion”, Jul. 4, 2023, 9 pages.
Rocha, et al., “A2best: an Adaptive Authentication Service Based on Mobile User’s Behavior and Spatio-temporal Context”, Institute of Electrical and Electronics Engineers (IEEE), Symposium on Computers and Communications (ISCC), Jun. 28, 2011, pp. 771-774.
Tang, et al., “A Self-Adaptive Bell-LaPadula Model Based on Model Training with Historical Access Logs”, Institute of Electrical and Electronics Engineers Transactions on Information Forensics and Security, vol. 13, No. 8, Feb. 19, 2018, pp. 2047-2061.
European Application No. EP25181142.8, “Office Action”, Feb. 6, 2026, 5 pages.

* cited by examiner

DEVICE-AGNOSTIC ACCESS CONTROL TECHNIQUES

CROSS-REFERENCE TO RELATED APPLICATIONS

This application is a continuation of U.S. Ser. No. 17/657,055, filed Mar. 29, 2022, entitled "DEVICE-AGNOSTIC ACCESS CONTROL TECHNIQUES", the disclosure of which is hereby incorporated by reference.

TECHNICAL FIELD

The present disclosure relates generally to risk assessment and access control. More specifically, but not by way of limitation, this disclosure relates to controlling access to an interactive computing environment using device agnostic techniques.

BACKGROUND

Various interactions are performed frequently through an interactive computing environment (e.g., a website). Controlling access to the environment is important to the security and performance of the system. One way is control access to the environment is to authenticate the user through a username/password combination, multi-factor authentication, and the like. However, users may acquire one or more new devices periodically. Existing systems automatically challenge (e.g., require multi-factor authentication or deny) every authentication attempt originating from a new or otherwise unfamiliar device. Challenging every authentication attempt from an unfamiliar device is inefficient and may prevent a legitimate user from accessing the interactive computing environment.

SUMMARY

Various aspects of the present disclosure provide systems and methods for controlling access of a computing device to an interactive computing environment using device-agnostic techniques involving behavioral fingerprints of legitimate entities based on historical entity data. The historical entity data can include a vector comprising features and sub-features associated with a first entity. The features may relate to one or more authentication attempts made by the first entity, and the sub-features may include variations of the features. The historical entity data can be determined by generating synthetic data, generating weights, and determining probabilities. The synthetic data can be generated based on historical authentication attempts by entities different than the first entity. The weights can be determined using a gradient descent function and can correspond, or otherwise be applied, to the sub-features. The probabilities can correspond, or otherwise be applied, to the sub-features using the weights. The probabilities can indicate a likelihood that a corresponding sub-feature is involved in the authentication attempt.

The historical entity data can be compared to authentication data associated with the authentication attempt. The comparison may indicate whether the authentication attempt is associated with, or otherwise performed by, the first entity. The comparison can be transmitted, to a remote computing device and via a responsive message, for controlling access to the interactive computing environment.

In other aspects, a method can efficiently control access to an interactive computing environment. Authentication data that is associated with an authentication attempt of a first entity can be received. Historical data, which comprises a plurality of features each comprising a plurality of sub-features, for the first entity can be determined by generating synthetic data, generating weights, and determining probabilities. The synthetic data can be based on historical authentication attempts associated with entities that are not the first entity. The weights can correspond to sub-features of the historical data. The probabilities can indicate likelihoods that corresponding sub-features are involved in the authentication attempt. The historical data can be compared to the authentication data. A responsive message for controlling access to the interactive computing device can be transmitted.

In other aspects, a non-transitory computer-readable medium can include instructions that are executable by a processing device for causing the processing device to perform various operations. The operations can include receiving authentication data associated with an authentication attempt by a first entity. The operations can include determining historical data, which includes features that include sub-features, for the first entity. The historical data can be determined by generating synthetic data, determining weights, and determining probabilities. The synthetic data can be based on historical authentication attempts associated with entities that are not the first entity. The weights can correspond to sub-features of the historical data. The probabilities can indicate likelihoods that corresponding sub-features are involved in the authentication attempt. The operations can include comparing the historical data and the authentication data. The operations can include transmitting a responsive message based on the comparison for controlling access to an interactive computing environment.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
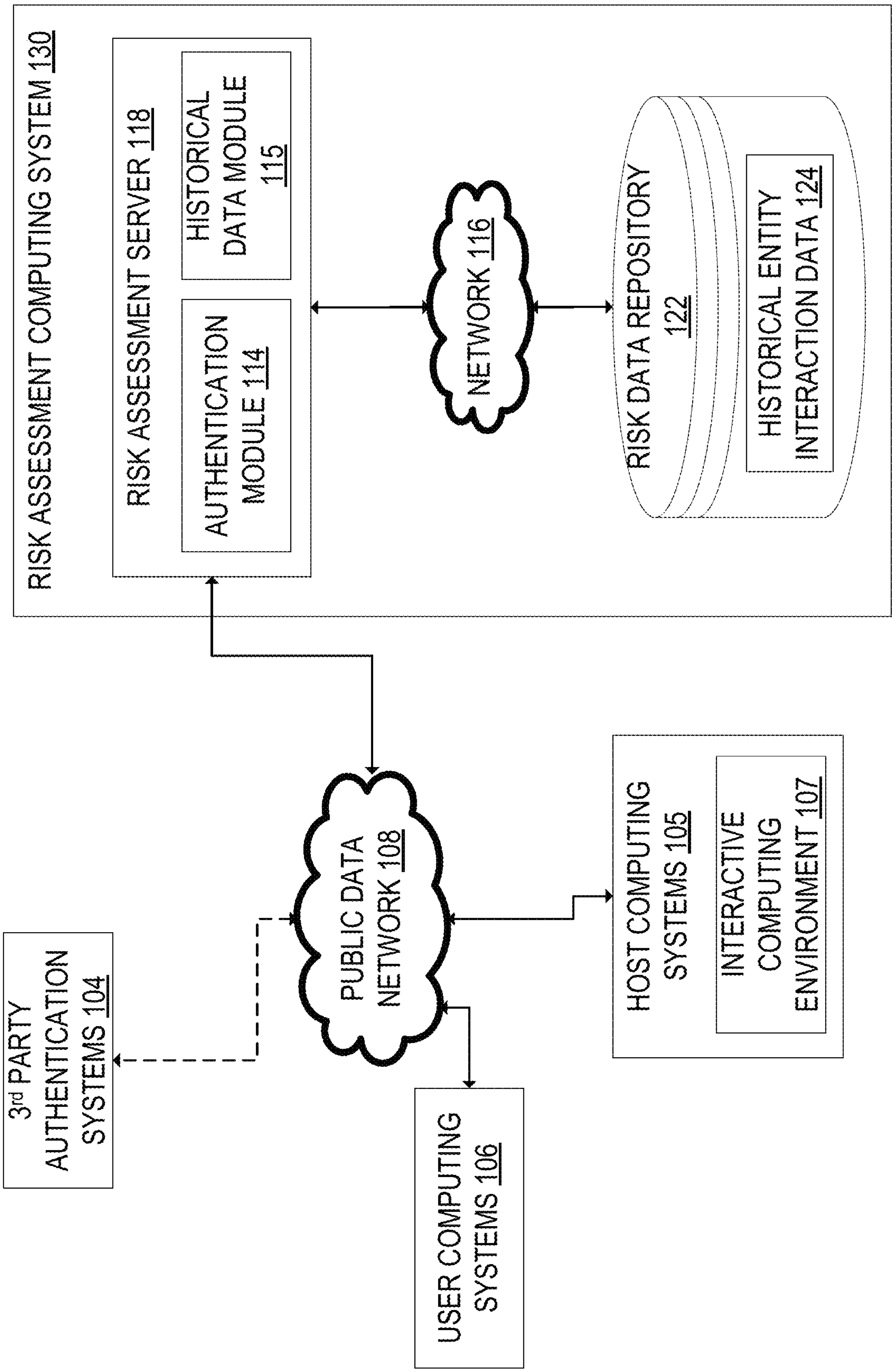
FIG. 1 is a block diagram depicting an example of a computing environment in which access to an interactive computing environment can be controlled using historical data according to certain aspects of the present disclosure.

Controlling access to an interactive computing environment properly can improve the security of the interactive computing environment. For example, requiring a username/password combination, multi-factor authentication, biometric authentication, and the like can provide security for sensitive accounts or data included in the interactive computing environment. Some systems are configured to challenge any authentication attempt received from a new or otherwise unfamiliar device. Challenging the authentication attempt may involve requesting additional authentication information (e.g., multi-factor authentication, biometric authentication, etc.) or denying the authentication attempt. Challenging the authentication attempt each time the authentication attempt is made from the new or otherwise unfamiliar device increases an amount of computing resources used to access the interactive computing environment, reduces the response time of the interactive computing environment, and thus reduces the efficiency of the interactive computing environment. Additionally, challenging each authentication attempt originating from the new or otherwise unfamiliar device can prevent some legitimate entities from accessing the interactive computing environment.

Certain aspects described herein for controlling access to the interactive computing environment using historical data can address one or more issues identified above. For example, instead of challenging each authentication attempt originating from a new or otherwise unfamiliar device, a risk assessment computing system can use the historical data to determine whether the authentication attempt was made by a legitimate entity. For example, the historical data can represent a history of authentication attempts made by the legitimate entity, and the risk assessment computing system can compare the historical data to authentication data, which can be generated in response to the authentication attempt, for determining whether to challenge the authentication attempt. In some examples, the historical data can be a behavioral fingerprint for the legitimate entity, and the behavioral fingerprint can indicate a likelihood that an authentication attempt originating from a new or otherwise unfamiliar device (or from other suitable devices) is made by the legitimate entity. Accordingly, the risk assessment computing system can more efficiently, using fewer computing resources and with less response time, control access to the interactive computing environment using the historical data without compromising the security of the environment.

In some examples, the historical data can include a historical vector for controlling access to the interactive computing environment. For example, the historical vector can represent historical behavior of a legitimate entity (e.g., a user of the interactive computing environment). The historical vector can include features and sub-features associated with one or more historical authentication attempts by the legitimate entity. For example, the features can represent a browser from which the legitimate entity made the authentication attempt, a clickstream path taken by the legitimate entity for making the authentication attempt, a geolocation of the legitimate entity during the authentication attempt, other suitable features for the historical vector, or any suitable combination thereof. The sub-features can include variations of the features. For example, the sub-feature of the browser feature can include one or more different types of browsers (e.g., Chrome®, Edge®, Firefox®, etc.), the sub-feature (e.g., permutations) of the clickstream can include different paths taken to make the authentication attempt, etc.

The sub-features of the historical vector can each be associated with a probability. For example, a first sub-feature of the browser feature can have a probability of 0.4 associated therewith, and a second sub-feature of the browser feature can be associated with a probability of 0.6, which indicates that the second sub-feature is more likely to be involved in the authentication attempt made by the legitimate entity than the first sub-feature. The probabilities may provide an improved risk assessment with respect to the authentication attempt. For example, the probabilities can make the behavioral fingerprint (or the historical vector) more accurate than other methods, and the more accurate behavioral fingerprint (or historical vector) can allow the risk assessment computing system to more efficiently and accurately control access to the interactive computing environment.

The probabilities of the sub-features can be determined by corresponding weights, which can be determined from synthetic data. The synthetic data can be generated using a set of authentication attempts made by a set of entities (each of which being different than the legitimate entity). The synthetic data may include feature vectors or other suitable data that do not match or are otherwise not similar to the historical vector or authentication vector associated with the legitimate entity. The risk assessment computing system can compare (e.g., via a gradient descent function or other suitable function) the synthetic data to control data (e.g., associated with the legitimate entity) for determining the weights. The risk assessment computing system can use the weights to determine the probabilities for one or more of the sub-features of the historical vector.

The risk assessment computing system can use the historical vector for controlling access to an interactive computing environment more efficiently (e.g., using fewer computing resources with less response time) than other systems. For example, by comparing the historical vector to the authentication data, the risk assessment computing system can determine whether the authentication attempt was made by the legitimate entity, instead of a new entity that could be a malicious entity such as a hacker. Techniques for risk assessment that involve the historical vector may be device-agnostic, which may allow the legitimate entity to efficiently access the interactive computing environment regardless of the device used by the legitimate entity.

Certain aspects described herein, which can include determining the historical vector and controlling access to the interactive computing environment based on the historical vector, can improve the technical field of access control for a computing environment. For instance, by using the historical vector, the risk assessment computing system may provide legitimate access to the interactive computing environment using fewer computing resources compared to other risk assessment systems. For example, the other risk assessment systems may always challenge authentication attempts associated with new or otherwise unfamiliar devices, while the risk assessment computing system that uses the historical vector may not challenge the authentication attempts in some instances. In some examples, by determining that the authentication attempt is legitimate (e.g., using the historical vector) without always challenging the authentication attempts, the risk assessment computing system reduces the amount of computational resources (e.g., memory, processing time, network bandwidth, etc.) used to authenticate the user. For example, the risk assessment computing system may not request additional authentication information to determine that the authentication attempt is legitimate. Additionally, by determining that the authentication attempt is legitimate without always challenging the authentication attempts, the risk assessment computing system reduces the amount of time used to login via the authentication attempt.

Accordingly, the risk assessment computing system improves the access control for computing environment by reducing memory usage, processing time, network bandwidth consumption, response time, and the like with respect to controlling access to the interactive computing environment.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Controlling Access to a Computing Environment

Referring now to the drawings, FIG. 1 is a block diagram depicting an example of a computing environment 100 in which access to an interactive computing environment 107 can be controlled using historical data according to certain aspects of the present disclosure. FIG. 1 depicts examples of hardware components of a risk assessment computing system 130, according to some aspects. The risk assessment computing system 130 can be a specialized computing system that may be used for processing large amounts of data (e.g., for controlling access to the interactive computing environment 107, etc.) using a large number of computer processing cycles. The risk assessment computing system 130 can include a risk assessment server 118 for validating risk assessment data from various sources. In some examples, the risk assessment computing system 130 can include other suitable components, servers, subsystems, etc.

The risk assessment server 118 can include one or more processing devices that can execute program code, such as an authentication module 114 or a historical data module 115. The program code can be stored on a non-transitory computer-readable medium or other suitable medium. The authentication module 114 can execute one or more processes to authenticate a request from a user (e.g., a user of user computing systems 106) to access the interactive computing environment 107. The risk assessment server 118 can then perform risk assessment validation operations or access control operations for validating or otherwise authenticating (e.g., using other suitable modules, models, components, etc. of the risk assessment server 118) received data such as authentication data received from the user computing systems 106. In some aspects, the authentication module 114 can authenticate the request by utilizing historical entity interaction data 124, which can include data relating to historical authentication attempts by various users or other suitable data. The historical entity interaction data 124 can be stored in one or more network-attached storage units on which various repositories, databases, or other structures are stored. Examples of these data structures can include the risk data repository 122.

Network-attached storage units may store a variety of different types of data organized in a variety of different ways and from a variety of different sources. For example, the network-attached storage unit may include storage other than primary storage located within the risk assessment server 118 that is directly accessible by processors located therein. In some aspects, the network-attached storage unit may include secondary, tertiary, or auxiliary storage, such as large hard drives, servers, and virtual memory, among other types of suitable storage. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory devices, or other suitable media.

Furthermore, the risk assessment computing system 130 can communicate with various other computing systems. The other computing systems can include host computing systems 105, user computing systems 106 (e.g., smartphones, personal computers, etc.), 3$^{rd}$ party authentication systems 104, and other suitable computing systems. For example, user computing systems 106 may send requests for accessing the interactive computing environment 107 to the host computing systems 105. In response, the host computing systems 105 can send the authentication queries to the risk assessment server 118. While FIG. 1 shows that the risk assessment computing system 130 and the host computing system 105 are separate systems, they can be one system. For example, the risk assessment computing system 130 can be a part of the host computing system 105.

In the example shown in FIG. 1, the risk assessment computing system 130 may also interact with the host computing systems 105 via one or more public data networks 108 to facilitate interactions between users of the user computing systems 106 and the interactive computing environment 107. For example, the risk assessment computing system 130 can provide or cause the host computing system 105 to provide a user interface to the user computing system 106 for receiving authentication data from the user. The risk assessment computing system 130 can transmit validated risk assessment data to the host computing system 105 for providing (or challenging, rejecting, etc.) access of the user to the interactive computing environment 107. In some examples, the risk assessment computing system 130 can additionally communicate with the 3$^{rd}$ party authentication systems 104 (e.g., to receive additional risk assessment data, etc.) through the public data network 108.

Each host computing system 105 may include one or more devices, such as individual servers or groups of servers operating in a distributed manner. A host computing system 105 can include any computing device or group of computing devices operated by a seller, lender, or other suitable provider of products or services. The host computing system 105 can include one or more server devices. The one or more server devices can include or can otherwise access one or more non-transitory computer-readable media.

The host computing system 105 can further include one or more processing devices that can be capable of providing an interactive computing environment 107 (e.g., a user interface, etc.) that can perform various operations. The interactive computing environment 107 can include executable instructions stored in one or more non-transitory computer-readable media. The instructions providing the interactive computing environment can configure one or more processing devices to perform the various operations. In some aspects, the executable instructions for the interactive computing environment can include instructions that provide one or more graphical interfaces. The graphical interfaces can be used by a user computing system 106 to access various functions of the interactive computing environment 107. For instance, the interactive computing environment may transmit data to and receive data (e.g., via the graphical interface) from a user computing system 106 to shift between different states of the interactive computing environment 107, where the different states allow one or more electronics interactions between the user computing system 106 and the host computing system 105 to be performed.

In some examples, the host computing system 105 may include other computing resources associated therewith (e.g., not shown in FIG. 1), such as server computers hosting and managing virtual machine instances for providing cloud computing services, server computers hosting and managing online storage resources for users, server computers for providing database services, and others. The interaction between the user computing system 106, the host computing system 105, and the risk assessment computing system 130, or any suitable sub-combination thereof may be performed through graphical user interfaces (e.g., the user interface) presented by the risk assessment computing system 130 to the user computing system 106, or through an application programming interface (API) calls or web service calls, or through other suitable techniques.

A user computing system 106 can include any computing device or other communication device operated by a user or entity, such as a consumer or a customer. The user computing system 106 can include one or more computing devices, such as laptops, smartphones, and other personal computing devices. A user computing system 106 can include executable instructions stored in one or more non-transitory computer-readable media. The user computing system 106 can also include one or more processing devices that are capable of executing program code to perform various operations. In various examples, the user computing system 106 can allow a user to access certain online services from a host computing system 105 or other computing resources, to engage in mobile commerce with a host computing system 105, to obtain controlled access to electronic content (e.g., the interactive computing environment 107) hosted by the host computing system 105, etc.

For instance, the user can use the user computing system 106 to engage in an electronic transaction with a host computing system 105 via the interactive computing environment 107. The risk assessment computing system 130 can receive a request, for example from the user computing system 106, to request access to the interactive computing environment 107 and can use data (e.g., authentication data and historical data) to determine whether to challenge the request. An electronic transaction between the user computing system 106 and the host computing system 105 can include, for example, the user computing system 106 being used to request a financial loan or other suitable services or products from the host computing system 105, and so on. An electronic transaction between the user computing system 106 and the host computing system 105 can also include, for example, one or more queries for a set of sensitive or otherwise controlled data, accessing online financial services provided via the interactive computing environment 107, submitting an online credit card application or other digital application to the host computing system 105 via the interactive computing environment 107, operating an electronic tool within the interactive computing environment 107 (e.g., a content-modification feature, an application-processing feature, etc.), etc.

In some aspects, an interactive computing environment 107 implemented through the host computing system 105 can be used to provide access to various online functions. As a simplified example, a user interface or other interactive computing environment 107 provided by the host computing system 105 can include electronic functions for requesting computing resources, online storage resources, network resources, database resources, or other types of resources. In another example, a website or other interactive computing environment 107 provided by a host computing system 105 can include electronic functions for obtaining one or more financial services, such as an asset report, management tools, credit card application and transaction management workflows, electronic fund transfers, etc.

A user computing system 106 can be used to request access to the interactive computing environment 107 provided by the host computing system 105. The host computing system 105 can submit a request (e.g., in response to a request made by the user computing system 106 to access the interactive computing environment 107) for risk assessment to the risk assessment computing system 130 and can selectively grant or deny access to various electronic functions based on risk assessment performed by the risk assessment computing system 130. Based on the request, the risk assessment computing system 130 can determine historical data and authentication data. Based on the data determined by the risk assessment server 118, the risk assessment computing system 130, the host computing system 105, or a combination thereof can determine whether to grant the access request of the user computing system 106 to certain features of the interactive computing environment 107.

In a simplified example, the system depicted in FIG. 1 can configure the risk assessment server 118 to be used for controlling access to the interactive computing environment 107. The risk assessment server 118 can receive or generate authentication data, for example, based on the information provided by the host computing system 105 (e.g., information collected by the host computing system 105 via a user interface provided to the user computing system 106). The risk assessment server 118 can compare the authentication data to historical data determined based on the historical entity interaction data 124. The risk assessment server 118 can transmit the comparison to the host computing system 105 for use in controlling access to the interactive computing environment 107.

In some examples, the comparison between the historical data and the authentication data can be utilized (e.g., by the risk assessment computing system 130, the 3$^{rd}$ party authentication systems 104, etc.) to determine whether the risk associated with the user accessing a service provided by the host computing system 105 exceeds a threshold, thereby granting, challenging, or denying access by the user to the interactive computing environment 107. For example, if the risk assessment computing system 130 determines that the comparison is lower than a threshold value, then the host computing system 105 associated with the service provider can generate or otherwise provide access permission to the user computing system 106 that requested the access. The access permission can include, for example, cryptographic keys used to generate valid access credentials or decryption keys used to decrypt access credentials. The host computing system 105 can also allocate resources to the user and provide a dedicated web address for the allocated resources to the user computing system 106, for example, by adding the user computing system 106 in the access permission. With the obtained access credentials or the dedicated web address, the user computing system 106 can establish a secure network connection to the interactive computing environment 107 hosted by the host computing system 105 and access the resources via invoking API calls, web service calls, HTTP requests, or other proper mechanisms.

In some examples, the risk assessment computing system 130 may determine whether to grant, challenge, or deny the access request made by the user computing system 106 for accessing the interactive computing environment 107. For example, based on the comparison between the historical data and the authentication data, the risk assessment computing system 130 can determine that a legitimate entity made the access request and may authenticate the request. In other examples, the risk assessment computing system 130 can challenge or deny the access attempt if the risk assessment computing system 130 determines that the legitimate entity may not have made the access request. The risk assessment computing system 130 may perform, via device-agnostic techniques involving a behavioral fingerprint of the legitimate entity, a comparison between the authentication data and the historical data. In some examples, the risk assessment computing system 130, in response to determining that the access request should not be challenged, may transmit a request to the 3rd party authentication system 104 to validate information provided by the user computing system 106 is accurate, such as the phone number or the email address. Depending on the information being validated, the 3rd party authentication system 104 may be a system associated with a telecommunications service provider, an email service provider, or other corresponding service provider.

Each communication within the computing environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the risk assessment server 118 and the risk data repository 122, may be instead implemented in a single device or system. Similarly and as discussed above, the risk assessment computing system 130 may be a part of the host computing system 105.

Figure 2:
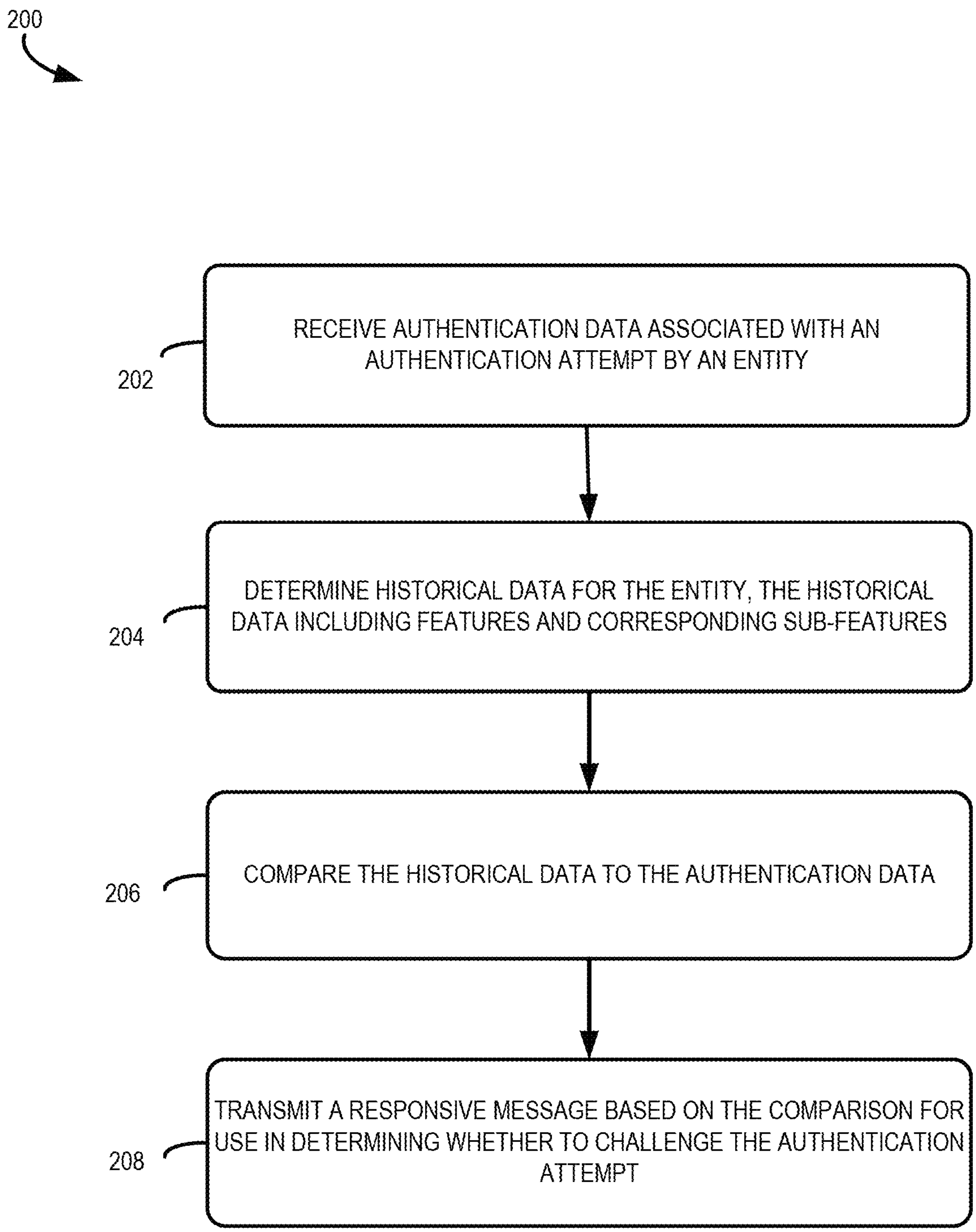
FIG. 2 is a flow chart depicting an example of a process for controlling access to an interactive computing environment using historical data according to certain aspects of the present disclosure.

Techniques for Controlling Access to a Computing Environment Using Historical Data FIG. 2 is a flow chart depicting an example of a process 200 for controlling access to an interactive computing environment 107 using historical data according to certain aspects of the present disclosure. One or more computing devices (e.g., the risk assessment computing system 130) implement operations depicted in FIG. 2 by executing suitable program code (e.g., the historical data module 115). For illustrative purposes, the process 200 is described with reference to certain examples depicted in the figures. Other implementations, however, are possible.

At block 202, the process 200 involves receiving authentication data associated with an authentication attempt by an entity. In some examples, the risk assessment server 118 (e.g., via the authentication module 114 or other suitable module) may receive the authentication data. The authentication attempt may include an attempt by the entity to access the interactive computing environment 107. The authentication data can include various authenticating data, such as a username/password combination, and various associated data such as information about the authentication attempt. The information about the authentication attempt can include a clickstream path taken by the entity, a time of the authentication attempt, a country-of-origin of the authentication attempt, and the like. In some examples, the entity may use the user computing system 106 to transmit the authentication attempt for accessing the interactive computing environment 107 of the host computing system 105.

In some examples, the authentication module 114 (or other suitable module) can generate an authentication vector based on the authentication data. The authentication vector can include a set of features, and each feature of the set of features can include a set of sub-features. The authentication vector can be an n-length vector, and each feature of the authentication vector can include different numbers of sub-features (though some features may include similar amounts of sub-features). For example, some of the features can include a geolocation of the entity, a clickstream path, a browser, and a time that the authentication attempt was made. The clickstream path feature can include more sub-features (e.g., five, 22, 90, or more) than the sub-features (e.g., two, three, four, etc.) of the browser feature, but may include fewer sub-features than the sub-features (e.g., more than 10,000) of the time feature of the authentication vector. Additionally, the authentication vector may be a binary vector. For example, each value included in the authentication vector may be either zero or one. As an example, the sub-features of the browser feature of the authentication vector can include Chrome®, Edge®, and Opera®, which may can be represented by values of one, zero, and zero, respectively, which indicates that the entity associated with the authentication vector used Chrome® to execute the authentication attempt. The authentication vector can include other suitable features, sub-features, and values.

At block 204, the process 200 involves determining historical data for a legitimate entity associated with the authentication attempt. In some examples, the historical data module 115 can determine the historical data for the legitimate entity (e.g., based on information included in the authentication attempt). The legitimate entity may be the same as the entity making the authentication attempt. In other examples, the entity making the authentication attempt may be a malicious entity (e.g., a hacker). While the entity making the authentication attempt may be the malicious entity, the historical data may relate to the legitimate entity for determining whether to provide access based on the authentication attempt.

In some examples, the historical data can include a historical entity vector that has the same or similar dimension and structure as the authentication vector discussed above. The historical entity vector can include a set of features, and each feature of the set of features can include a set of sub-features. The historical entity vector can be an n-length vector, and each feature of the historical entity vector can include different numbers of sub-features (though some features may include similar amounts of sub-features). For example, some of the features can include historical geolocations of the legitimate entity, a clickstream path, a browser, and a time that the authentication attempt was made. The clickstream path feature can include more sub-features (e.g., five, 22, 90, or more) than the sub-features (e.g., two, three, four, etc.) of the browser feature, but may include fewer sub-features than the sub-features (e.g., more than 10,000) of the time feature of the historical entity vector. In some examples, the features and the sub-features of the historical entity vector and of the authentication vector may be similar or identical (e.g., for facilitating comparison).

In some examples, the geolocation-related features (e.g., the geolocation of the entity, the historical geolocations of the legitimate entity, etc.) can include a feature vector. The feature vector can include one or more sub-features that correspond to one or more various geolocations. Each sub-feature of the feature vector of the historical entity vector can include a value that may correspond to a likelihood that the legitimate entity made the authentication attempt from the corresponding sub-feature.

At block 206, the process 200 involves comparing the historical data to the authentication data. In some examples, the historical data module 115 (or any other suitable module or computing device) can compare the historical data to the authentication data. Features of the historical data can be compared to similar features of the authentication data. For example, the browser feature (and associated sub-features) of the historical data can be compared to the browser feature (and associated sub-features) of the authentication data.

In some examples, comparing the historical data to the authentication data can involve determining a cosine similarity (or any other suitable type of similarity measurement) between the authentication data (e.g., the authentication vector) and the historical data (e.g., the historical entity vector). The cosine similarity can be determined using equation 1:

$$\cos(u_x, u_y) = \frac{\sum_{s_k \in S_{xy}} r_{x,k} r_{x,y}}{\sqrt{\sum_{s_k \in S_{xy}} r_{x,k}^2 \sum_{s_k \in S_{xy}} r_{y,k}^2}} \quad \text{(Equation 1)}$$

where $u_x$ is the historical entity vector, $u_y$ is the authentication vector, and the r elements represent the sub features within each of the respective vectors.

Additionally, the cosine similarity can be compared to a predetermined threshold value that indicates a likelihood of the authentication attempt being executed by the legitimate entity. Additionally, comparing the historical data to the authentication data may involve comparing the feature vector (e.g., relating to the geolocation of the legitimate entity) of the historical data to the feature vector (e.g., relating to the geolocation of the entity executing the authentication attempt) of the authentication data. The threshold value may be a value below which (or above which with respect to the feature vectors, etc.) the risk assessment server 118 may determine that the entity executing the authentication attempt may not be the legitimate entity.

In some examples, the comparison can involve comparing geolocations. The authentication vector can include a geolocation of the entity executing the authentication attempt, and the historical entity vector can include a feature vector corresponding to historical geolocations of the legitimate entity. By comparing the geolocations, one or more distances between the geolocation of the entity and one or more historical geolocations of the legitimate entity can be determined. The one or more distances can be compared (e.g., each one at a time) to a threshold distance. In some examples, if one distance of the one or more distances is less than the threshold distance, the risk assessment server 118 can determine that the authentication attempt should not be challenged since the entity is likely the legitimate entity.

At block 208, the process 200 involves transmitting a responsive message based on the comparison (e.g., performed at the block 206). In some examples, the historical data module 115 (or any other suitable module or computing device) can transmit the responsive message to a computing device (e.g., the host computing system 105) or any other suitable computing device that can control access to the interactive computing environment 107. The responsive message can vary based on the comparison. For example, the responsive message may indicate that the entity making the authentication request is the legitimate entity and may recommend granting access to the interactive computing environment 107 based on the authentication attempt. In other examples, the responsive message may indicate that the entity is unknown or otherwise not associated with the legitimate entity and may recommend challenging or denying the authentication attempt.

In examples in which the risk assessment computing system 130 recommends challenging the authentication attempt, the authentication attempt may be challenged or denied. For example, the host computing system 105 may challenge the authentication attempt by requesting additional authentication information such as multi-factor authentication information, biometric authentication information, or the like. Additionally or alternatively, the risk assessment computing system 130 can make an initial decision regarding whether to challenge the authentication attempt and can optionally transmit the authentication data or any suitable subset thereof to the 3$^{rd}$ party authentication system to verify accuracy of the authentication data. Accordingly, the risk assessment computing system 130 can receive a response from the 3$^{rd}$ party authentication system 104 that indicates whether the data is accurate and can, in response to determining that the data is not accurate, recommend that the host computing system 105 request additional information or authentication data from the entity prior to granting access to the interactive computing environment 107.

Techniques for Generating a Historical Vector

Figure 3:
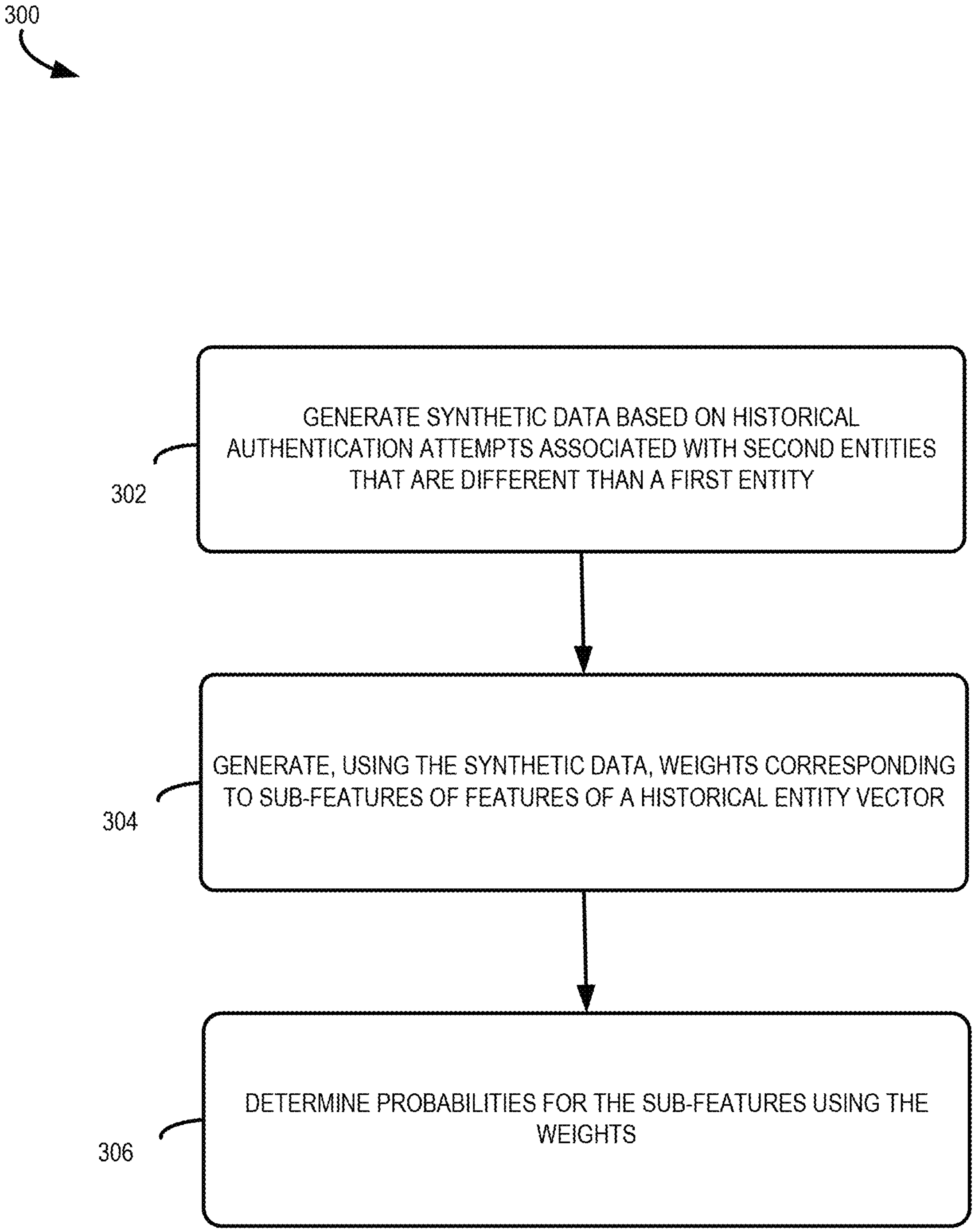
FIG. 3 is a flow chart depicting an example of a process for generating historical data according to certain aspects of the present disclosure.

FIG. 3 is a flow chart depicting an example of a process 300 for generating historical data according to certain aspects of the present disclosure. One or more computing devices (e.g., the risk assessment computing system 130) implement operations depicted in FIG. 3 by executing suitable program code (e.g., the historical data module 115). For illustrative purposes, the process 300 is described with reference to certain examples depicted in the figures. Other implementations, however, are possible.

At block 302, the process 300 involves generating synthetic data based on historical authentication attempts made by entities different than the legitimate entity. In some examples, the historical data module 115 (or any other suitable module or computing device) can generate the synthetic data. The entities different than the legitimate entity may include other, non-malicious entities that have previously attempted (e.g., successfully and for accessing accounts not associated with the legitimate entity) to access the interactive computing environment 107. Thus, in some examples, the synthetic data may exclude authentication data or other suitable data that is from or otherwise associated with the legitimate entity. In some examples, the synthetic data can include control data (e.g., that is retrieved based on historical authentication attempts made by the legitimate entity) that is shuffled to match other entities that are not the legitimate entity. Accordingly, the synthetic data will not represent authentication attempts made by the legitimate entity and may provide a counter-example of legitimate authentication attempts that can be used to generate weights for the historical data.

At block 304, the process 300 involves generating weights corresponding to sub-features of the historical data. In some examples, the historical data module 115 (or any other suitable module or computing device) can generate the weights. The weights may be applied to each sub-feature included in the historical entity vector for determining the values of each sub-feature. For example, if the historical entity vector include 56 sub-features, then the historical data module 115 (or any other suitable module or computing device) may generate 56 different weights corresponding to the 56 sub-features. In some examples, one or more subsets of the weights may sum to 1 (or other suitable value). For example, the weights of sub-features of a single feature (e.g., the browser feature, etc.) may sum to 1, etc. In some examples, larger weights can be applied to more common sub-features, while smaller weights can be applied to less common or otherwise rare sub-features. The weights can be determined using other suitable techniques.

In some examples, the control data, the synthetic data, and a gradient descent function can be used to generate the weights to be applied to the sub-features of the historical data. For example, the limited-memory Broyden-Fletcher-Goldfarb-Shanno (L-BFGS) algorithm can be used to generate the weights using Equation 2, which is a cosine similarity equation. For example, the log-loss defined in Equation 2 can be minimized to determine the weights. This loss shown in Equation 2 is defined between weighted actual values $g_i$, such as sub-features from the authentication vector, and weighted historical values $p_i$, such as sub-features of the historical entity vector. Weights that minimize the log-loss function can be used to determine the similarity or distance between the authentication vector and the historical entity vector for determining whether the legitimate entity performed the authentication attempt. The weights $w_k$ used in Equation 3 are determined from Equation 2 such that the weights, when applied to $g_i$ and $p_i$, minimize the log-loss function of Equation 2.

$$\text{Logloss} = -\frac{1}{N}\sum_{i=1}^{N}[g_i \ln p_i + (1-g_i)\ln(1-p_i)] \quad \text{(Equation 2)}$$

$$\cos(u_x, u_y) = \frac{\sum_{s_k \in S_{xy}} w_k r_{x,k} r_{y,k}}{\sqrt{\sum_{s_k \in S_{xy}} r_{x,k}^2 \sum_{s_k \in S_{xy}} r_{y,k}^2}} \quad \text{(Equation 3)}$$

At block 306, the process 300 involves determining, based on the weights, probabilities of the sub-features of the historical data being involved in an authentication attempt made by the legitimate entity. Each probability can represent a probability that a corresponding sub-feature is involved in an authentication attempt. In some examples, historical data module 115 (or any other suitable module or computing device) can determine the probabilities. The probabilities can correspond to the sub-features of the historical data such that the value of each sub-feature of the historical data is a corresponding probability.

In some examples, the value of respective sub-feature of the historical data can be the determined probabilities. For example, the weights of the respective sub-features can be applied to raw probabilities of the sub-features. For example, the legitimate entity may use Chrome® as a browser for executing an authentication attempt 75% of the time. Applying a weight value of 0.1 determined for Chrome® based on usage of Chrome® among a set of entities, such as internet users in a country, can yield a determined probability of 0.75×0.1=0.075. Thus, if the determined probability that the legitimate entity uses Chrome® as a browser is 0.075, then the value for the Chrome® sub-feature of the historical data may also be 0.075, etc.

In some examples, the features of the historical entity vector may include high cardinality features and low cardinality features. Low cardinality features may include features (e.g., browser, etc.) having less than a threshold number (e.g., ten) of sub-features. High cardinality features may include features (e.g., clickstream path, etc.) having more than the threshold number (e.g., ten) of sub-features. The dimension of the high-cardinality features can be reduced. For example, a subset of the sub-features of the high cardinality feature can be collapsed into an "other" sub-feature. Additionally or alternatively, principal component analysis can be performed on the high cardinality feature (or other suitable portions of the historical data) to reduce the dimensionality of the high cardinality feature. Additional or alternative to principal component analysis, other suitable dimension-reducing techniques, such as embeddings and the like, can be used.

In some examples, the process 300 can additionally include binning data from historical authentication attempts (e.g., made by the legitimate entity). The binning can involve generating a histogram, determining one or more bins of the histogram, and clustering the data. The histogram can be generated based on data associated with the historical authentication attempts of the legitimate entity. The histogram can include a set of sub-features corresponding to one or more features of the historical data. The bins of the histogram can be determined based on an amount of peaks included in the histogram. Accordingly, the data can be clustered into the bins using k-means clustering or any other suitable clustering techniques (e.g., density clustering, etc.). The determined probabilities can correspond to the sub-features of the histogram and can be further determined based on the clustered data. For example, each of the determined probabilities can correspond to at least one bin or sub-feature of the histogram, and the sub-features of the histogram can be the sub-features of the historical entity vector. Additionally, the clustered data can be used in calculations, such as determining the weights and the like, to determine the probabilities. For example, a probability for executing an authentication attempt in a time range of 7 AM to 8 AM can be determined. The clustered data in this example includes data from authentication attempts made within the time range. The clustered data can be used to determine a likelihood that the legitimate entity will execute an authentication attempt in the time range and can also be used to determine a weight, as discussed above, for the time range. In this example, the weight is applied to the likelihood to determine the probability.

In some examples, the historical data (e.g., the historical entity vector, etc.) can be periodically determined. The risk assessment computing system 130 can determine the historical data and can use the historical data for a predetermined amount of time (e.g., a day, a week, a month, a year, etc.), and, subsequent to the predetermined amount of time elapsing, the risk assessment computing system 130 can re-determine the historical data. In some examples, the risk assessment computing system 130 can re-generate the historical entity vector using more recent data.

Figure 4:
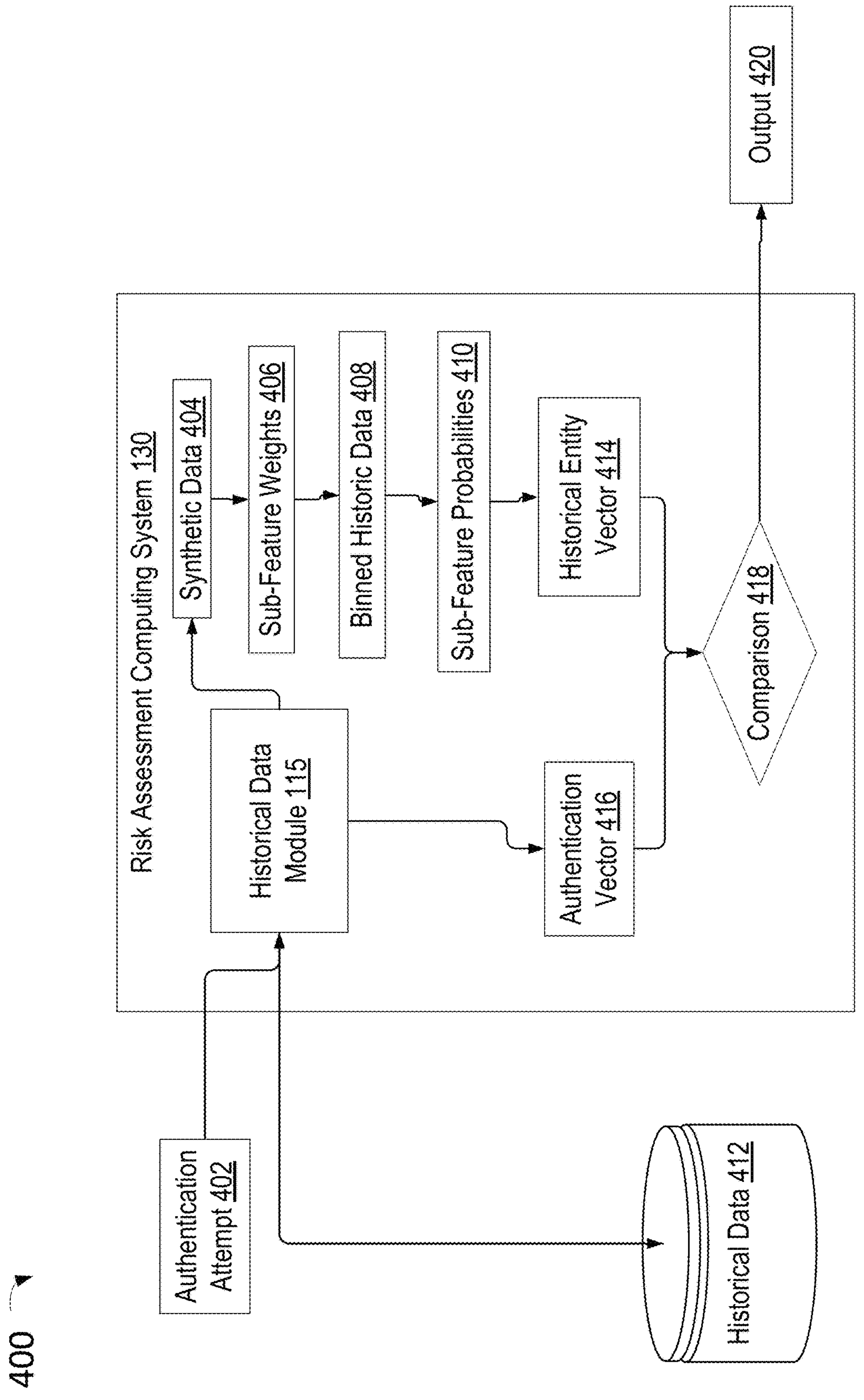
FIG. 4 is a flow diagram depicting an example of controlling access to an interactive computing environment using historical data according to certain aspects of the present disclosure.

Exemplary Flow for Controlling Access to Computing Environment with Historical Data FIG. 4 is a flow diagram 400 depicting an example of controlling access to an interactive computing environment 107 using historical data according to certain aspects of the present disclosure. An authentication attempt 402 can be executed by an entity for attempting to gain access to an interactive computing environment 107. The authentication attempt 402 can be transmitted (e.g., via the user computing system 106) to the risk assessment computing system 130. In some examples, the authentication attempt 402 can be received by the historical data module 115 or other suitable component (e.g., the risk assessment server 118, the authentication module 114, etc.) of the risk assessment computing system 130. The historical data module 115 (or other suitable component of the risk assessment computing system 130) can additionally receive historical data 412, which can include data about historical authentication attempts made by a legitimate entity.

The historical data module 115 (or other suitable component of the risk assessment computing system 130) can use data relating to the authentication attempt 402 to generate an authentication vector 416. The historical data module 115 (or other suitable component of the risk assessment computing system 130) can additionally use the historical data 412, other suitable data (e.g., from the authentication attempt 402), or a combination thereof to determine a historical entity vector 414. For example, the historical data module 115 (or other suitable component of the risk assessment computing system 130), based on techniques described with respect to the process 300, can generate synthetic data 404, can generate weights 406 of sub-features of the historical entity vector 414, can generate binned historic data 408, and can determine sub-feature probabilities 410. The historical data module 115 (or other suitable component of the risk assessment computing system 130) can use the synthetic data 404, the weights 406, the binned historic data 408, and the sub-feature probabilities 410 to generate the historical entity vector 414, which may represent a behavioral (or other suitable type of device-agnostic) fingerprint for the legitimate entity.

The historical data module 115 (or other suitable component of the risk assessment computing system 130) can execute a comparison 418 between the authentication vector 416 and the historical entity vector 414. The comparison 418 can involve determining a cosine similarity (or other suitable type of similarity) between the authentication vector 416 and the historical entity vector 414. The historical data module 115 (or other suitable component of the risk assessment computing system 130) can generate an output 420 based on the comparison 418.

In some examples, the output 420 can include a recommendation to not challenge the authentication attempt 402 since the comparison 418 indicated that the entity executing the authentication attempt 402 is likely the legitimate entity. Alternatively, the output 420 can include a recommendation to challenge or deny the authentication attempt 402 since the comparison 418 indicated that the entity executing the authentication attempt 402 is likely not the legitimate entity. In such examples, the output 420 may include a denial of the authentication attempt or a request to the user computing system 106 or other suitable computing system for additional authentication information such as multi-factor authentication information, biometric information, and the like.

Example of Computing System

Figure 5:
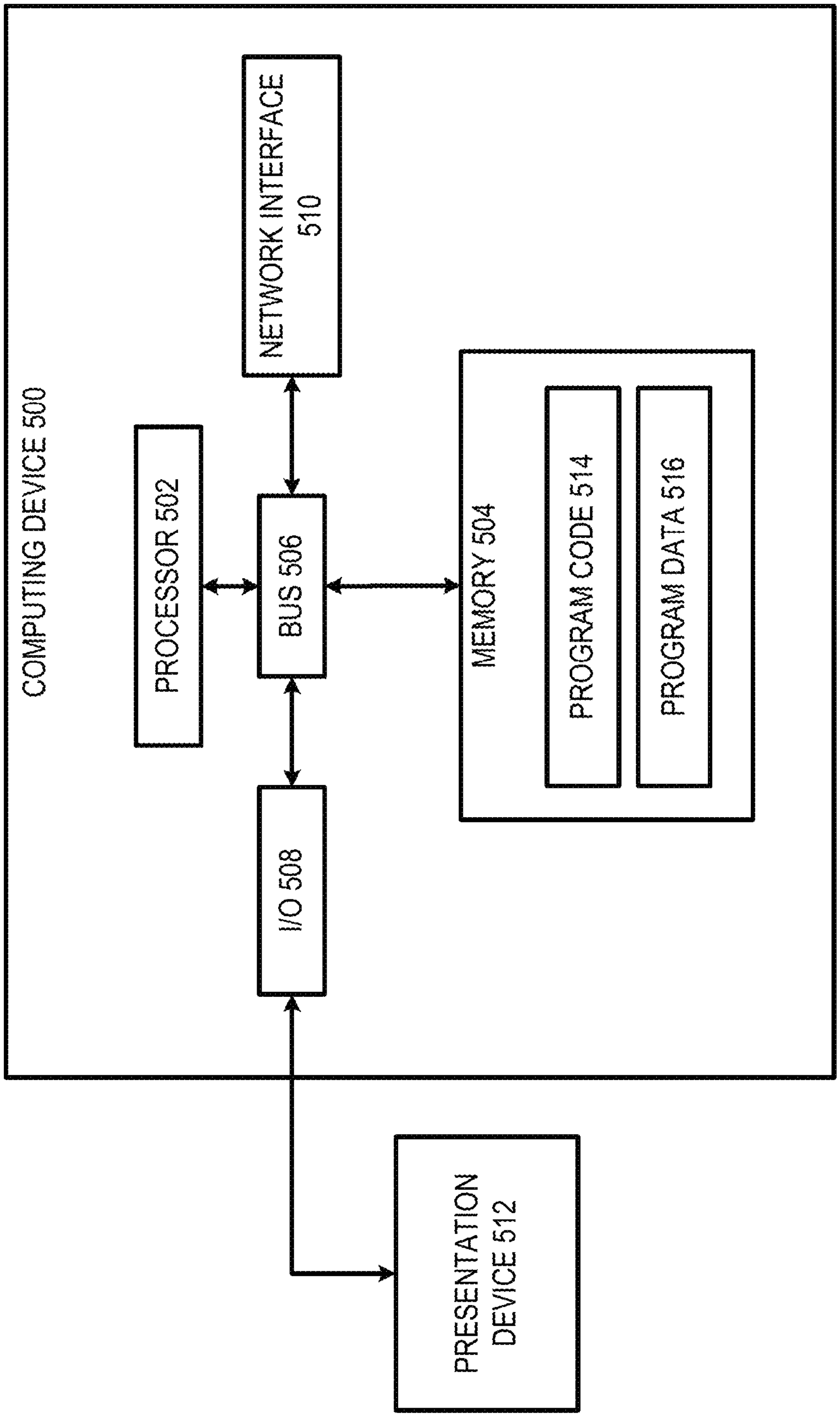
FIG. 5 is a block diagram depicting an example of a computing system suitable for implementing aspects of the techniques and technologies presented herein.

Any suitable computing system or group of computing systems can be used to perform the operations for the machine-learning operations described herein. For example, FIG. 5 is a block diagram depicting an example of a computing device 500, which can be used to implement the risk assessment server 118 or other suitable components of the computing environment 100. The computing device 500 can include various devices for communicating with other devices in the computing environment 100, as described with respect to FIG. 1. The computing device 500 can include various devices for performing one or more data consolidation or validation (or other suitable) operations described above with respect to FIGS. 1-4.

The computing device 500 can include a processor 502 that is communicatively coupled to a memory 504. The processor 502 can execute computer-executable program code stored in the memory 504, can access information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others.

Examples of a processor 502 can include a microprocessor, an application-specific integrated circuit (ASIC), a field-programmable gate array (FPGA), or any other suitable processing device. The processor 502 can include any suitable number of processing devices, including one. The processor 502 can include or communicate with a memory 504. The memory 504 can store program code that, when executed by the processor 502, causes the processor 502 to perform the operations described herein.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language can include Hadoop, C, C++, C #, Visual Basic, Java, Python, Perl, JavaScript, ActionScript, etc.

The computing device 500 may also include a number of external or internal devices such as input or output devices. For example, the computing device 500 is illustrated with an input/output interface 508 that can receive input from input devices or provide output to output devices. A bus 506 can also be included in the computing device 500. The bus 506 can communicatively couple one or more components of the computing device 500.

The computing device 500 can execute program code 514 that can include the historical data module 115. The program code 514 for the historical data module 115 may be resident in any suitable computer-readable medium and may be executed on any suitable processing device. For example, as depicted in FIG. 5, the program code 514 for the historical data module 115 can reside in the memory 504 at the computing device 500 along with the program data 516 associated with the program code 514, such as the historical entity interaction data 124. Executing the historical data module 115 can configure the processor 502 to perform the operations described herein.

In some aspects, the computing device 500 can include one or more output devices. One example of an output device can be the network interface device 510 depicted in FIG. 5. A network interface device 510 can include any device or group of devices suitable for establishing a wired or wireless data connection to one or more data networks described herein. Non-limiting examples of the network interface device 510 can include an Ethernet network adapter, a modem, etc.

Another example of an output device can include the presentation device 512 depicted in FIG. 5. A presentation device 512 can include any device or group of devices suitable for providing visual, auditory, or other suitable sensory output. Non-limiting examples of the presentation device 512 can include a touchscreen, a monitor, a speaker, a separate mobile computing device, etc. In some aspects, the presentation device 512 can include a remote client-computing device that communicates with the computing device 500 using one or more data networks described herein. In other aspects, the presentation device 512 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A system comprising:

a processor; and a non-transitory computer-readable medium comprising instructions that are executable by the processor to cause the processor to perform operations comprising:

determining a historical entity vector for a first entity having performed an authentication attempt associated with authentication data, the historical entity vector comprising a plurality of features each comprising a plurality of sub-features, the historical entity vector determined by:

generating synthetic data based on a plurality of historical authentication attempts associated with one or more second entities;

generating, based on the synthetic data, weights corresponding to the plurality of sub-features of the historical entity vector; and determining a plurality of probabilities of the plurality of sub-features using the weights of the plurality of sub-features, each probability of the plurality of probabilities indicating a likelihood that a corresponding sub-feature is involved in the authentication attempt; and generating a responsive message by comparing the historical entity vector and the authentication data, the responsive message for use in controlling access to an interactive computing environment.

2. The system of claim 1, wherein the operations further comprise generating, based on the authentication data, an authentication vector that comprises a plurality of features each comprising a plurality of sub-features having respective binary values.

3. The system of claim 2, wherein an operation of comparing the historical entity vector and the authentication data comprises:

determining a cosine similarity between the authentication vector and the historical entity vector; and comparing the cosine similarity to a threshold value that indicates likelihood of the authentication attempt being executed by the first entity.

4. The system of claim 1, wherein the operations further comprise performing principal component analysis on the historical entity vector to reduce a dimensionality of the historical entity vector.

5. The system of claim 1, wherein the plurality of features comprises a clickstream path that defines an ordered path taken by the first entity to execute the authentication attempt.

6. The system of claim 1, wherein:

the plurality of features comprises a plurality of historical geolocations of the first entity;

the plurality of historical geolocations of the first entity is a feature vector that comprises geolocation features corresponding to probabilities that indicate a likelihood of the first entity executing authentication attempts at corresponding geolocations; and an operation of comparing the historical entity vector and the authentication data comprises comparing the feature vector to a geolocation feature of the authentication data, the geolocation feature of the authentication data indicating a geolocation of the first entity associated with the authentication attempt.

7. The system of claim 1, wherein the operations further comprise binning data from the plurality of historical authentication attempts of the first entity by, for each feature of the plurality of features of the historical entity vector:

generating a histogram based on the data from the plurality of historical authentication attempts of the first entity, the histogram comprising a plurality of sub-features corresponding to a feature of the plurality of features of the historical entity vector;

determining one or more bins of the histogram based on an amount of peaks of the histogram;

clustering the data, which comprises the plurality of sub-features, into the one or more bins; and wherein the plurality of probabilities corresponding to the plurality of sub-features are further determined based on the clustered data.

8. The system of claim 7, wherein the operation of clustering the data into the one or more bins comprises clustering the data using k-means clustering.

9. A method comprising:

determining, by a processing device, a historical entity vector for a first entity having performed an authentication attempt associated with authentication data, the historical entity vector comprising a plurality of features each comprising a plurality of sub-features, the historical entity vector determined by:

generating, by the processing device, synthetic data based on a plurality of historical authentication attempts associated with one or more second entities;

generating, by the processing device and based on the synthetic data, weights corresponding to the plurality of sub-features of the historical entity vector; and determining, by the processing device, a plurality of probabilities of the plurality of sub-features using the weights of the plurality of sub-features, each probability of the plurality of probabilities indicating a likelihood that a corresponding sub-feature is involved in the authentication attempt; and generating, by the processing device, a responsive message by comparing the historical entity vector and the authentication data, the responsive message for use in controlling access to an interactive computing environment.

10. The method of claim 9, further comprising generating, by the processing device and based on the authentication data, an authentication vector that comprises a plurality of features each comprising a plurality of sub-features having respective binary values.

11. The method of claim 10, wherein an operation of comparing the historical entity vector and the authentication data comprises:

determining, by the processing device, a cosine similarity between the authentication vector and the historical entity vector; and comparing, by the processing device, the cosine similarity to a threshold value that indicates likelihood of the authentication attempt being executed by the first entity.

12. The method of claim 9, further comprising performing, by the processing device, principal component analysis on the historical entity vector to reduce a dimensionality of the historical entity vector.

13. The method of claim 9, wherein the plurality of features comprises a clickstream path that defines an ordered path taken by the first entity to execute the authentication attempt.

14. The method of claim 9, wherein:

the plurality of features comprises a plurality of historical geolocations of the first entity;

the plurality of historical geolocations of the first entity is a feature vector that comprises geolocation features corresponding to probabilities that indicate a likelihood of the first entity executing authentication attempts at corresponding geolocations; and performing a comparison between the historical entity vector and the authentication data comprises comparing, by the processing device, the feature vector to a geolocation feature of the authentication data, the geolocation feature of the authentication data indicating a geolocation of the first entity associated with the authentication attempt.

15. The method of claim 9, further comprising binning, by the processing device, data from the plurality of historical authentication attempts of the first entity by, for each feature of the plurality of features of the historical entity vector:

generating, by the processing device, a histogram based on the data from the plurality of historical authentication attempts of the first entity, the histogram comprising a plurality of sub-features corresponding to a feature of the plurality of features of the historical entity vector;

determining, by the processing device, one or more bins of the histogram based on an amount of peaks of the histogram;

clustering, by the processing device, the data, which comprises the plurality of sub-features, into the one or more bins; and wherein the plurality of probabilities corresponding to the plurality of sub-features are further determined based on the clustered data.

16. A non-transitory computer-readable medium comprising instructions that are executable by a processing device for causing the processing device to perform operations comprising:

determining a historical entity vector for a first entity having performed an authentication attempt associated with authentication data, the historical entity vector comprising a plurality of features each comprising a plurality of sub-features, the historical entity vector determined by:

generating synthetic data based on a plurality of historical authentication attempts associated with one or more second entities;

generating, based on the synthetic data, weights corresponding to the plurality of sub-features of the historical entity vector; and determining a plurality of probabilities of the plurality of sub-features using the weights of the plurality of sub-features, each probability of the plurality of probabilities indicating a likelihood that a corresponding sub-feature is involved in the authentication attempt; and generating a responsive message by comparing the historical entity vector and the authentication data, the responsive message for use in controlling access to an interactive computing environment.

17. The non-transitory computer-readable medium of claim 16, wherein the operations further comprise generating, based on the authentication data, an authentication vector that comprises a plurality of features each comprising a plurality of sub-features having respective binary values, and wherein an operation of comparing the historical entity vector and the authentication data comprises:

determining a cosine similarity between the authentication vector and the historical entity vector; and comparing the cosine similarity to a threshold value that indicates likelihood of the authentication attempt being executed by the first entity.

18. The non-transitory computer-readable medium of claim 16, wherein the operations further comprise performing principal component analysis on the historical entity vector to reduce a dimensionality of the historical entity vector.

19. The non-transitory computer-readable medium of claim 16, wherein the plurality of features comprises a clickstream path that defines an ordered path taken by the first entity to execute the authentication attempt.

20. The non-transitory computer-readable medium of claim 16, wherein:

the plurality of features comprises a plurality of historical geolocations of the first entity;

the plurality of historical geolocations of the first entity is a feature vector that comprises geolocation features corresponding to probabilities that indicate a likelihood of the first entity executing authentication attempts at corresponding geolocations; and an operation of comparing the historical entity vector and the authentication data comprises comparing the feature vector to a geolocation feature of the authentication data, the geolocation feature of the authentication data indicating a geolocation of the first entity associated with the authentication attempt.

* * * * *